United States Patent
He et al.

(10) Patent No.: US 10,732,601 B2
(45) Date of Patent: Aug. 4, 2020

(54) INTEGRATED CONTROLLER FOR MOTION CONTROL AND MOTOR CONTROL

(71) Applicant: RTIMEMAN MOTION CONTROL CO., LTD., Shanghai (CN)

(72) Inventors: Yan He, Shanghai (CN); Shaoqiu Gong, Shanghai (CN); Shuguo Zhang, Shanghai (CN); Ruiqin Li, Shanghai (CN); Jin Qian, Shanghai (CN); Wenbin Tang, Shanghai (CN); Qichao Wang, Shanghai (CN); Yun Feng, Shanghai (CN); Yuejin Hu, Shanghai (CN); Dongping Fan, Shanghai (CN)

(73) Assignee: RTIMEMAN MOTION CONTROL CO., LTD., Shanghai (CN)

( * ) Notice: Subject to any disclaimer, the term of this patent is extended or adjusted under 35 U.S.C. 154(b) by 27 days.

(21) Appl. No.: 16/145,036

(22) Filed: Sep. 27, 2018

(65) Prior Publication Data

US 2019/0041823 A1 Feb. 7, 2019

(30) Foreign Application Priority Data

Apr. 25, 2018 (CN) .......................... 2018 1 0380436

(51) Int. Cl.
*G05B 19/05* (2006.01)
*G06F 12/084* (2016.01)
(Continued)

(52) U.S. Cl.
CPC ....... *G05B 19/054* (2013.01); *G05B 19/0421* (2013.01); *G05B 19/258* (2013.01); *G05B 19/414* (2013.01); *G06F 12/084* (2013.01); *G06F 15/167* (2013.01); *G05B 2219/34008* (2013.01); *G05B 2219/34069* (2013.01); *G05B 2219/34208* (2013.01); *G05B 2219/34287* (2013.01); *G06F 12/0842* (2013.01); *G06F 2212/621* (2013.01)

(58) Field of Classification Search
CPC .......................... G05B 19/0421; G05B 19/054; G05B 19/258; G05B 19/414; G05B 2219/34008; G05B 2219/34069; G05B 2219/34208; G05B 2219/34287; G06F 12/084; G06F 12/0842; G06F 15/167; G06F 2212/621
See application file for complete search history.

(56) References Cited

U.S. PATENT DOCUMENTS

| | | | | |
|---|---|---|---|---|
| 2011/0022822 A1* | 1/2011 | Chandhoke | ........... | G06F 9/5066 712/36 |
| 2014/0025930 A1* | 1/2014 | Lee | ........... | G06F 12/084 712/205 |
| 2016/0274191 A1* | 9/2016 | Gerdes | ........... | B60L 3/0061 |

* cited by examiner

*Primary Examiner* — Yuhui R Pan
(74) *Attorney, Agent, or Firm* — Tianchen LLC.; Yuan R. Li; Yi Fan Yin

(57) ABSTRACT

An integrated controller for motion control and motor control comprises a first processor, a second processor, a cache and a shared memory. The first processor is configured to run an operating system and at least perform motion control. The second processor is configured to at least perform motor control and normally not run the operating system. The cache is coupled to the first processor and the second processor. The shared memory maps onto the cache. The first processor and the second processor are configured to share the shared memory and accordingly perform data transmission via the cache during the periods of motion control and motor control. The first processor, the second processor and the cache are integrated in a same chip.

18 Claims, 5 Drawing Sheets

(51) Int. Cl.
*G05B 19/25* (2006.01)
*G05B 19/414* (2006.01)
*G06F 15/167* (2006.01)
*G05B 19/042* (2006.01)
*G06F 12/0842* (2016.01)

INTEGRATED CONTROLLER FOR MOTION CONTROL AND MOTOR CONTROL

CROSS-REFERENCE TO RELATED APPLICATION

This application claims the priority benefit of China patent application serial No. 201810380436.6, filed Apr. 25, 2018. The entirety of each of the above-mentioned patent applications is hereby incorporated by reference herein and made a part of this specification.

FIELD OF THE INVENTION

The present invention generally relates to a controller, and more particularly, to an integrated controller for motion control and motor control.

BACKGROUND OF THE INVENTION

Motion control and motor control are core technologies in the field of industrial automation. The motion controller and the motor controller are two common critical control devices used in automatic apparatus which perform complicated operations. Integrated controllers for motion control and motor control can also be applied in other fields such as the field of Unmanned Aerial Vehicle.

Conventionally, most industrial automated systems, like robots or large-scale machine tools, adopt distributed control architecture. In a distributed control architecture, a motion controller works in conjunction with multiple motor controllers. Data transmission between the motion controller and the motor controller and between the motor controllers is achieved via buses like field buses.

Such distributed control architecture has a plurality of known disadvantages. For example, the excessive hardware may lead to high hardware cost and large space occupation. Furthermore, the bus communication protocol is vulnerable to interference and faces bottleneck problems in data transmission volume and data transmission rate.

Accordingly, the concept of "drive and control integration" is proposed by the industry to achieve an industrial controller which integrates the functions of the motion controller and the motor controller. However, the conventional drive and control integrated industrial controller is merely a simple physical combination of the motion controller and the motor controller. As a result, the improvement in cooperation of the two controllers is limited.

BRIEF SUMMARY OF THE DISCLOSURE

Accordingly, an objective of the present invention is to provide an integrated controller for motion control and motor control, which can reliably and stably improve the interaction rate between the motion control portion and the motor control portion.

In order to solve the above technical problem, the present invention provides an integrated controller for motion control and motor control which comprises a first processor, a second processor, a cache and a shared memory. The first processor is configured to run an operating system and at least perform motion control, wherein the motion control comprises calculating set values of kinematic pairs of a controlled object at each moment. The second processor is configured to at least perform motor control and normally not run the operating system, wherein the motor control comprises controlling rotation of motors according to the set values, which at least comprises any one or a combination of motor current loop control, motor speed loop control, and motor position loop control. The cache is coupled to the first processor and the second processor. The shared memory is a dedicated cacheable memory block with fixed addresses specified by the operating system. The shared memory maps onto the cache. The first processor and the second processor are configured to share the shared memory and accordingly perform data transmission via the cache during the periods of motion control and motor control. The first processor, the second processor and the cache are integrated in a same chip.

In an embodiment of the present invention, prior to the motion control and motor control, the integrated controller is configured to perform the following operations: starting the first processor and the second processor by symmetric multiprocessing; running the operating system on the first processor and the second processor; turning off the second processor and running the operating system individually on the first processor; re-starting and re-configuring the second processor to make the second processor normally not run the operating system.

In an embodiment of the present invention, the first processor is configured to write motion control data into the cache, the second processor is configured to read the motion control data from the cache, wherein the motion control data comprises position data, speed data, acceleration data, force data, and/or moment of force data for the kinematic pairs or the motors.

In an embodiment of the invention, the second processor is configured to write feedback data into the cache, the first processor is configured to read the feedback from the cache, wherein the feedback data comprises position data, speed data, acceleration data, force data, and/or moment of force data from the kinematic pairs or the motors.

The present invention also provides an integrated controller for motion control and motor control which comprises a first processor, a second processor, a cache, a shared memory and a programmable logic device. The first processor is configured to run an operating system and at least perform motion control, wherein the motion control comprises calculating set values of kinematic pairs of a controlled object at each moment. The second processor is configured to at least perform motor control and normally not run the operating system, wherein the motor control comprises controlling rotation of motors according to the set values, which at least comprises any one or a combination of motor current loop control, motor speed loop control, and motor position loop control. The cache is coupled to the first processor and the second processor. The shared memory is a dedicated cacheable memory block with fixed addresses specified by the operating system. The programmable logic device is coupled to the second processor and is configured to perform the motor control in conjunction with the second processor. The shared memory maps onto the cache. The first processor and the second processor are configured to share the shared memory and accordingly perform data transmission via the cache in the periods of motion control and motor control. The first processor, the second processor and the cache are integrated in a same chip.

In an embodiment of the present invention, the first processor is configured to write motion control data into the cache, the second processor is configured to read the motion control data from the cache, wherein the motion control data comprises position data, speed data, acceleration data, force data, and/or moment of force data for the kinematic pairs or the motors.

In an embodiment of the invention, the second processor is configured to write feedback data into the cache, the first processor is configured to read the feedback from the cache, wherein the feedback data comprises position data, speed data, acceleration data, force data, and/or moment of force data from the kinematic pairs or the motors.

In an embodiment of the invention, a clock of the programmable logic device and a clock of the second processor are synchronized. When the second processor reads or writes data from or to the programmable logic device, the programmable logic device latches the data being read or written.

In an embodiment of the present invention, prior to the motion control and motor control, the controller is configured to perform the following operations: starting the first processor and the second processor by symmetric multiprocessing; running the operating system on the first processor and the second processor; turning off the second processor and running the operating system individually on the first processor; re-starting and re-configuring the second processor to make the second processor normally not run the operating system.

The present invention also provides an integrated controller for motion control and motor control which comprises a first processor, a second processor, a cache, a shared memory and a programmable logic device. The first processor is configured to run an operating system and at least perform motion control, wherein the motion control comprises calculating set values of kinematic pairs of a controlled object at each moment. The second processor is configured to at least perform motor control and normally not run the operating system, wherein the motor control comprises controlling rotation of motors according to the set values, which at least comprises any one or a combination of motor current loop control, motor speed loop control, and motor position loop control. The cache is coupled to the first processor and the second processor. The shared memory is a dedicated cacheable memory block with fixed addresses specified by the operating system. The programmable logic device is coupled to the second processor and is configured to perform the motor control in conjunction with the second processor. The shared memory maps onto the cache. The first processor and the second processor are configured to share the shared memory and accordingly perform data transmission via the cache in the periods of motion control and motor control. The first processor, the second processor, the cache and the programmable logic device are integrated in a same chip.

In an embodiment of the present invention, the first processor is configured to write motion control data into the cache, the second processor is configured to read the motion control data from the cache, wherein the motion control data comprises position data, speed data, acceleration data, force data, and/or moment of force data for the kinematic pairs or the motors.

In an embodiment of the invention, the second processor is configured to write feedback data into the cache, the first processor is configured to read the feedback from the cache, wherein the feedback data comprises position data, speed data, acceleration data, force data, and/or moment of force data from the kinematic pairs or the motors.

In an embodiment of the present invention, prior to the motion control and motor control, the controller is configured to perform the following operations: starting the first processor and the second processor by symmetric multiprocessing; running the operating system on the first processor and the second processor; turning off the second processor and running the operating system individually on the first processor; re-starting and re-configuring the second processor to make the second processor normally not run the operating system.

Compared with the conventional technology, the present invention provides a controller with high real-time performance through a shared cache and special system configuration. Furthermore, since the drive and control integration system is built in a single chip, the data transmission is performed in the internal of the chip without external interference, which ensures proper and reliable data transmission. Moreover, the drive and control integration system also decreases hardware redundancy. Since the drive and control integration system can be realized by using a single SOC chip with necessary peripheral circuit elements, hardware occupation is also reduced.

BRIEF DESCRIPTION OF THE DRAWINGS

In order that technical solutions of the present invention may be more fully understood, the embodiments of the present invention will now be described in detail hereafter with reference to the accompanying drawings. Notably, the drawings are substantially used for illustrating the embodiments of the invention and should not be used as limitation to.

DETAILED DESCRIPTION OF THE EMBODIMENTS

In order that objects, characteristics, and advantages of the present invention may be more fully understood, the embodiments of the present invention will now be described in detail hereafter with reference to the accompanying drawings.

It should be appreciated by those skilled in the art that the specific embodiments disclosed might be readily utilized as a basis for modifying or designing other structures or processes for carrying out the purposes of the present invention. It should also be realized by those skilled in the art that such equivalent constructions and variations on the example embodiments described do not depart from the spirit of the invention.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the terms "couple", "connect" are intended to mean either an indirect or direct couple or connection. Accordingly, if one device is coupled to another device, that connection may be through a direct connection, or through an indirect connection via other components and connections, unless the context clearly indicates otherwise. The term "and/or" is intended to mean any or all combinations of one or more listed components.

Figure 1:
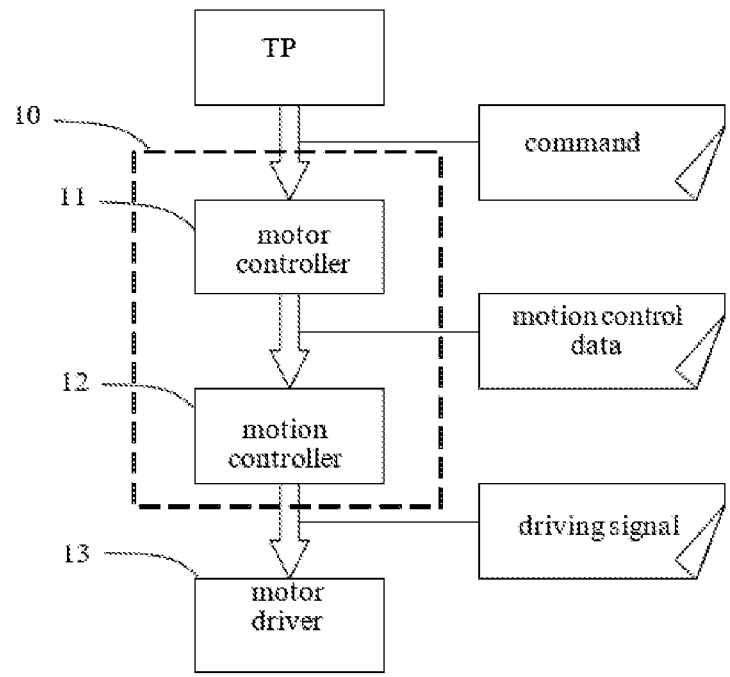
FIG. 1 is a block diagram of a controller according to an embodiment of the present invention.

The embodiments of the present invention describe a controller having motion control function and motor control function. FIG. 1 is a block diagram of the controller according to an embodiment of the present invention. It is understood by those skilled in the art that the motion control refers to computing target movements of kinematic pairs of a controlled object at every moment in specific applications. Herein, the kinematic pair refers to a movable connection between two bodies of the controlled object in contact with each other that imposes constraints on their relative movement, such as a joint. The motion control aims to obtain the relationship between the set values of kinematic pairs of the controlled object and time, as well as to generate corresponding "set values of kinematic pairs vs. time" data flow (data information) in spite of the changes in specific computing steps, computing targets, computing parameters and variables in different applications. The set values of kinematic pairs can be one or more of the position, the speed, the acceleration, the force and the moment of force of the kinematic pairs.

The motion control controls the rotation of the motors according to the "set values of kinematic pairs". In an embodiment of the present invention, the set values of kinematics pairs are converted into given values of motors of joints of the controlled object. The given values of motors can be one or more of the rotational angle, rotational speed, torque of the motor. The transition of the given values of motors from the set values of kinematic pairs can be performed by the motion control portion or the motor control portion, which is not limited herein. The set values of kinematic pairs are transmitted to the motor control portion on time at predetermined times such that the motor control portion can control the rotation of the motors accordingly. When the motors of all the axes reach their corresponding given values of motor within the required time, the resultant motion of the controlled object is achieved as expected. It is noted that, in the present invention, the motor control portion is expected to control multiple axes simultaneously and rapidly to ensure multi-axis synchronization and proper resultant motion. Furthermore, the motor control portion is also expected to achieve high data update and execution frequency, so as to meet the requirements of motion precision and motion continuity. As shown in FIG. 1, in an embodiment of the present invention, the integrated controller 10 comprises a motion controller 11 and a motor controller 12. The motion controller 11 can perform the aforementioned motion control function, the motor controller 12 can perform the aforementioned motor control function. A teach pendant is a host computer for the motion controller 11, for sending or editing application task instructions to the motion controller. The motion controller receives the instructions from the teach pendant and performs motion trajectory planning according to the instructions, and then transmits the motion control data, such as the given values of motors of multiple axes to the motor controller 12. The motor controller 12 produces control signal (like PWM signal) according to the given values and outputs the control signal to a motor driver 13, by which the motors are driven.

In the embodiments of the present invention, the controller 10 can be used in various applications such as electric robots, numerical control machine tools, electric multi-rotor type aircrafts, electromobiles, mechanical prosthesis, mechanical hands, electric movable vehicles, and so on, to perform motion control and motor control for multi-axis coordinated motor-driven apparatus.

In the embodiments of the present invention, the amount of motor axes is not limited, which can be either 6 or 8, or more or less.

Currently, in a conventional multi-axis automation system, data transmission between the motion controller and the motor controller, and between the motor controllers is achieved through filed buses. In the embodiment of the present invention, such communication protocol between the motion controller and the motor controllers is improved.

First Embodiment

Figure 2:
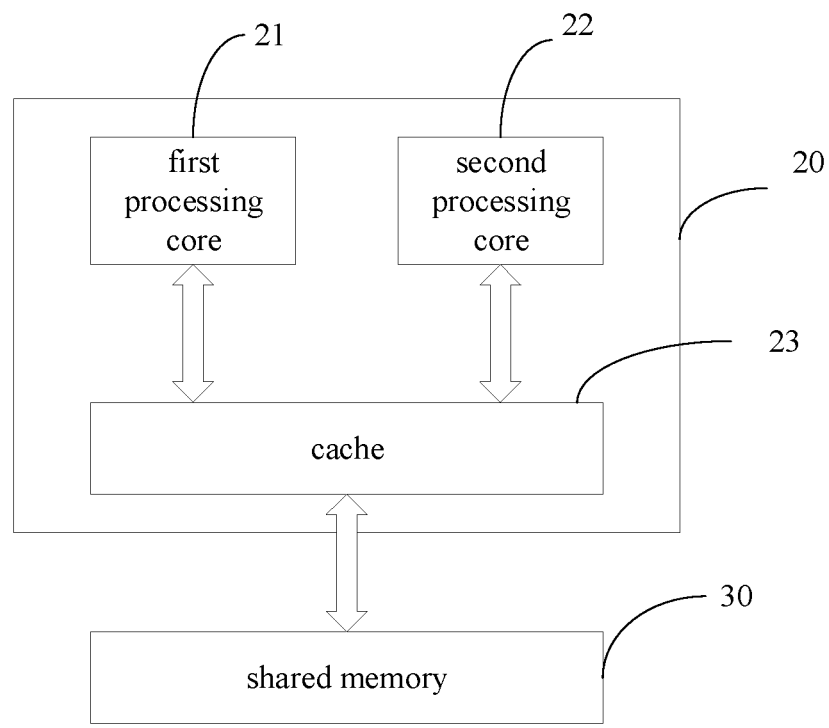
FIG. 2 is a circuit diagram of a controller according to a first embodiment of the present invention.

FIG. 2 is a circuit diagram of a controller according to a first embodiment of the present invention. As shown in FIG. 2, the integrated controller 20 for motion control and motor control comprises a first processing core 21, a second processing core 22, a cache 23 and a shared memory 30. The first processing core 21 is configured to run an operating system and at least perform motion control. The second processing core 22 is configured to perform motor control and normally not run the operating system. Herein, "normally" is defined to be most of the time. The cache, as known by those skilled in the art, is a memory between a processor and a main memory. The cache operates faster than the main memory at a speed almost close to the processor. The cache 23 can be a Level 2 cache (L2 cache) for a processor. It is understood that the cache 23 can be of other levels. The cache 23 is coupled to the first processing core 21 and the second processing core 22. The shared memory 30 memory is a dedicated cacheable memory block with fixed addresses, which is specified by the operating system run on the first processing core 21. The shared memory 30 maps onto the cache 23. The first processing core 21 and the second processing core 22 are configured to share the shared memory 30 and accordingly perform data transmission via the cache 23 during the periods of motion control and motor control. The first processor, the second processor and the cache are integrated in a same chip. For example, the shared memory 30 maps onto the cache 23 through address mapping. When the shared memory 30 maps onto the cache 23, data transmission is performed in the cache 23, which enhances the transmission rate by 8-10 times compared with direct data exchange in a physical memory.

In the context of the present invention, the processing core is a CPU. The CPU may also contain a cache, like a Level 1 cache (L1 cache). Multiple CPUs can be coupled to the L2 cache to perform communication therebetween.

In the current processor architecture, multiple processing cores sharing the same cache are usually integrated in a same processing chip. Therefore, in the embodiment, the first processing core 21, the second processing core 22 and the cache 23 are integrated in a same chip, such as a processing chip.

In the embodiment, the first processing core 21 runs the operating system and at least performs motion control. The operating system may supervise the operation of the whole controller. The operating system can also perform specific application tasks, like the motion control task. The motion control task aims to compute target movements of kinematic pairs of a controlled object at every moment. The implementation of the motion control can be various. For example, according to application requirements, different trajectory planning algorithms and task analysis software can be developed to perform various trajectory planning and joint-block conversion. The specific algorithms for such trajectory planning and joint-block conversion can also be greatly different according to applications. For example, forward kinematic algorithms and inverse kinematic algorithms can be applied in industrial robots; UAV flight control algorithms can be applied in UAVs. It is obvious to those skilled in the art to implement the motion control function as required.

In the embodiment, the operating system is a Linux system.

The first processing core 21 calculates one or more of the position, speed, acceleration, force and moment of force of the kinematic pairs of the object controlled by the controller 20 at each moment, which are taken as set values of kinematic pairs. In the embodiment, the first processing core 21 also converts the set values of kinematic pairs into given values of motors of the joints of the controlled object at each moment. The given values of motors include position, speed, acceleration, force, moment of force of the motors or their combination. The first processing core 21 outputs the given values of motors to the second processing core 22 at predetermined time. Alternatively, in other embodiments, the first processing core 21 may not perform conversion of set values of kinematic pairs to given values of motors. The first processing core 21 directly outputs the set values of kinematic pairs to the second processing core 22, then the second processing core 22 converts them into the given values of motors and performs corresponding motor control.

In the embodiment, the second processing core 22 performs motor control without normally running the same operating system as the first processing core 21 or without running any operating systems. According to their allocation, the first processing core 21 and the second processing core 22 normally operate in an asymmetric multiprocessing architecture. The second processing core 22 controls the motor driver according to the given values of motors to drive the motors to meet the requirements rapidly and stably. The motor control involves current loop control, speed loop control and/or position loop control. Different loop control may be implemented according to different given values of motors. Generally, when the give value is a positional value, all three loops are required to be calculated; when the given value is a speed related value (speed value or acceleration value), the current loop and the speed loop are required to be calculated; when the given value is a force value or moment of force value, the current loop is required to be calculated. Accordingly, the second processing core 22 alternatively performs the current loop control, or the combination of the current loop control and the speed loop control, or the combination of the current loop control, the speed loop control and the position loop control, to achieve the motor control task. Furthermore, the allocation of the tasks between the first processing core 21 and the second processing core 22 can be varied. For example, the first processing core 21 performs the position loop control, the second processing core 22 performs the speed loop control and the current loop control; or the first processing core 21 performs the position loop control and the speed loop control, the second processing core 22 performs the current loop control. The task allocation is determined according to the requirements of the loop calculation rate and the performance of the hardware platform.

The second processing core 22 calculates the current by which the motor can reach the required position, speed, acceleration, force or moment of force of the given values of motors, and outputs driving signal (like PWM signal) to power devices such as IGBT devices, IPM devices according to the calculated results to drive the motors.

In an embodiment, the second processing core 22 runs a different operating system than the first processing core 21. For example, the second processing core 22 runs a more streamlined operating system. In another embodiment, the second processing core 22 does not run any operating systems.

In some embodiments, the first processing core 21 and the second processing core 22 are ARM cores. For example, each processing core is an ARM Cortex-A9 MPCore, 4000 MIPS.

Conventionally, in an asymmetric multiprocessing architecture, the processing cores do not share a cache. Different from the prior art, sharing a shared memory through the cache in an asymmetric multiprocessing architecture is provided in the embodiment of the present invention. Although the first processing core 21 and the second processing core 22 use the asymmetric multiprocessing architecture, they still share the cache 23 and accordingly share the shared memory through the cache.

In order to implement such sharing, the controller is configured to perform the following operations prior to the motion control and the motor control:

Firstly, starting a Linux operating system on the first processor and the second processor by symmetric multiprocessing. Defining a block of memory to be the shared memory, allocating the shared memory to be an I/O memory such that the addresses of the shared memory are kept instead of being allocated to operating system processes and the shared memory is configured to be cacheable. Turning off the second processor through the operating system. By this time, the first processing core runs the operating system individually and uses the L2 cache. The first processing core is capable to access the shared memory in a cacheable way. Then re-starting and re-configuring the second processor to make the second processor normally not run the operating system. The second processing core is re-configured to use the L2 cache and access the shared memory in a cacheable way.

By the above means, the processing cores are capable to share the shared memory in an asymmetric multiprocessing architecture.

From above, the first processing core 21 and the second processing core 22 are configured to transfer data through the cache 23 (L2 cache) during the periods of motion control and motor control. Specifically, during the period of motion control, the first processing core 21 writes motion control data (like set values of kinematic pairs or given values of motor) into the cache 23, while the second processing core 22 reads the motion control data from the cache 23. As mentioned above, in the embodiments of the present invention, the motion control data comprises position data, speed data, acceleration data, force data, and/or moment of force data for the kinematic pairs or the motors, and is determined according to the task allocation between the first processing core 21 and the second processing core 22. Correspondingly, the second processing core 22 writes feedback data into the cache 23, while the first processing core 21 reads the feedback from the cache 23. The feedback data comprises position data, speed data, acceleration data, force data, force data and/or moment of force data from the kinematic pairs or the motors. When the motion control data is position data, then the feedback data generally comprises position data, and can further comprise speed related data, force data and moment of force data. When the motion control data is speed related data, then the feedback data comprises speed related data, and can further comprise position data, force data and moment of force data. It is understood that the feedback data can also be unrelated to the motion control data. For example, the feedback data can normally comprise one or more of position data, speed data, acceleration data, force data and moment of force data. In some applications, the feedback data may be position data or attitude data of the controlled object (like the attitude or speed of an UAV or electromobile).

For a control system of a multi-axis apparatus which requires accurate and smooth trajectory, it is expected that the motion control portion of the control system can reliably transmit the set values of kinematic pairs or given values of motors to the motor control portion in a short and consistent time period. In the embodiment, the first processing core and the second processing core work in an asymmetric multi-processing architecture in a way that the second processing core for motor control may run a simple operating system different from the first processing core or not run an operating system while the both two processing cores share the cache, thereby ensuring high-speed data transmission with high real-time performance (high real-time performance means low latency and low jittering).

Figure 3:
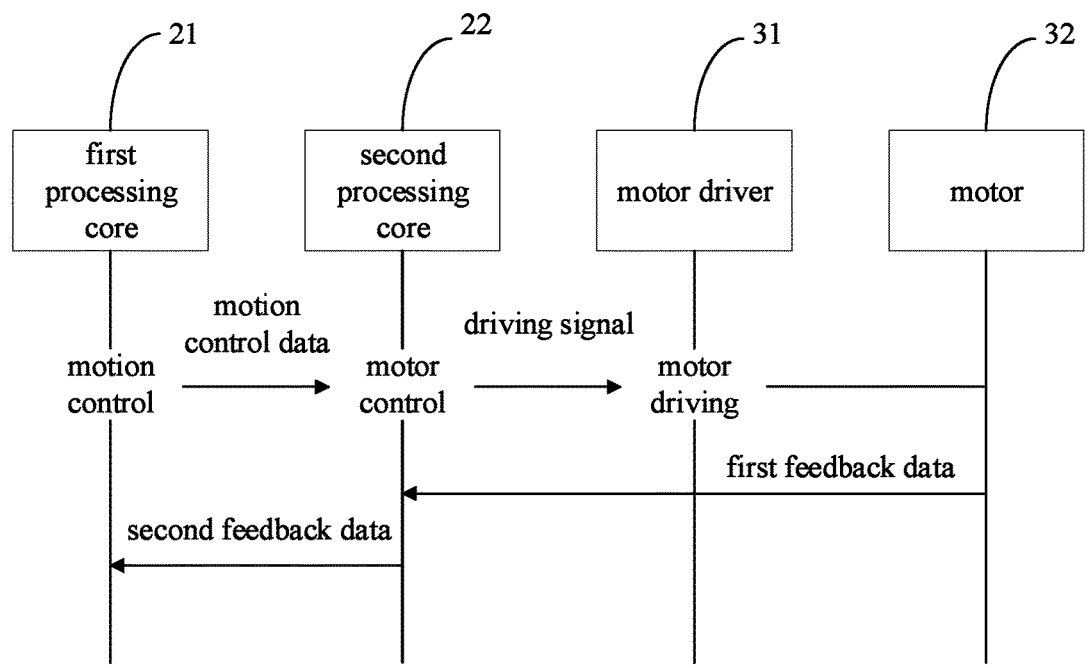
FIG. 3 is a diagram illustrating the operation of the controller according to the first embodiment of the present invention.

FIG. 3 is a diagram illustrating the operation of the controller according to the first embodiment of the present invention. As shown in FIG. 3, the first processing core 21 generates and outputs the motion control data to the second processing core 22. The second processing core 22 performs moto control according to the motion control data and outputs driving signal to the motor driver 31, the motor driver 31 outputs current to control the rotation of the motor 32. The first feedback data collected from the motor 32 is transmitted to the second processing core 22. The second processing core 22 outputs second feedback data to the first processing core 21. The first feedback data may comprise one or more of position data, speed data, acceleration data, force data and moment of force data. The second feedback may be completely obtained from the first feedback data, or may not be totally from the first feedback data. For example, the second feedback data may comprise data generated by the second processing core 22. As shown in FIG. 3, the communication between the first processing core 21 and the second processing core 22 is realized through the cache 23 as shown in FIG. 2. As required, the first feedback data or the second feedback data may not be necessary in local-loop control or complete-loop control, which will not affect the basic function and performance of the entire control system.

Since accessing a cache is much faster than accessing a main memory, the operation speed of the first processing core 21 and the second processing core 22 is greatly enhanced. Particularly, the first processing core 21 and the second processing core 22 are integrated in a single SOC chip, which has excellent data processing capability, thus high-speed data transmission can be realized within the SOC chip. In the embodiment which employs two ARM-Contex A9 cores as the first and second processing cores, the controller operates with an average latency of 19 μs and a maximum latency of 59 μs. The motion controller and the motor controller can transmit data at a rate of 10 kb (approximately data volume for 8-axis motors) per microsecond. The position loop updates every 200 microseconds, while data jittering is below 1 microsecond, that is, the jittering rate is 0.5%.

In an embodiment, the controller 20 further comprises a main memory, which contains the shared memory 30.

The present invention also provides a method to change the symmetric multiprocessing to asymmetric multiprocessing, so as to implement the aforementioned "sharing of the shared memory in an asymmetric multiprocessing architecture".

According to the method, the first processing core 21 and the second processing core 22 boot and run the Linux operating system under a symmetric multiprocessing mode. The first and the second processing cores both run the operating system. However, such operation state is non-normal, which only occurs when the controller is power-on. Then, a block of memory is specified to be a shared memory and is allocated to be an I/O memory. As a result, the addresses of the shared memory are kept without being allocated to other processes by the operating system, and the shared memory is specified as cacheable. Afterwards, the operating system turns off one of the processing cores, such as the second processing core 22. By this time, the first processing core individually runs the operating system and performs an access to the L2 cache. The first processing core also performs a cacheable access to the shared memory. Meanwhile, the second processing core 22 neither runs a different operating system compared with the first processing core 21 nor runs any operating systems. However, the operating system still supervises the cache and the shared memory in a symmetric multiprocessing mode since the operating system is not aware of the re-set up of the second processing core 22. Therefore, the first processing core 21 and the second processing core 22 share the cache as well as the shared memory in an asymmetric architecture. Specific codes for the above operations can be stored in a nonvolatile memory (such as a SD card, EMMC, or various Flashes) and executed by the first processing core 21 and the second processing core 22 when the controller 20 is power on.

Figure 7:
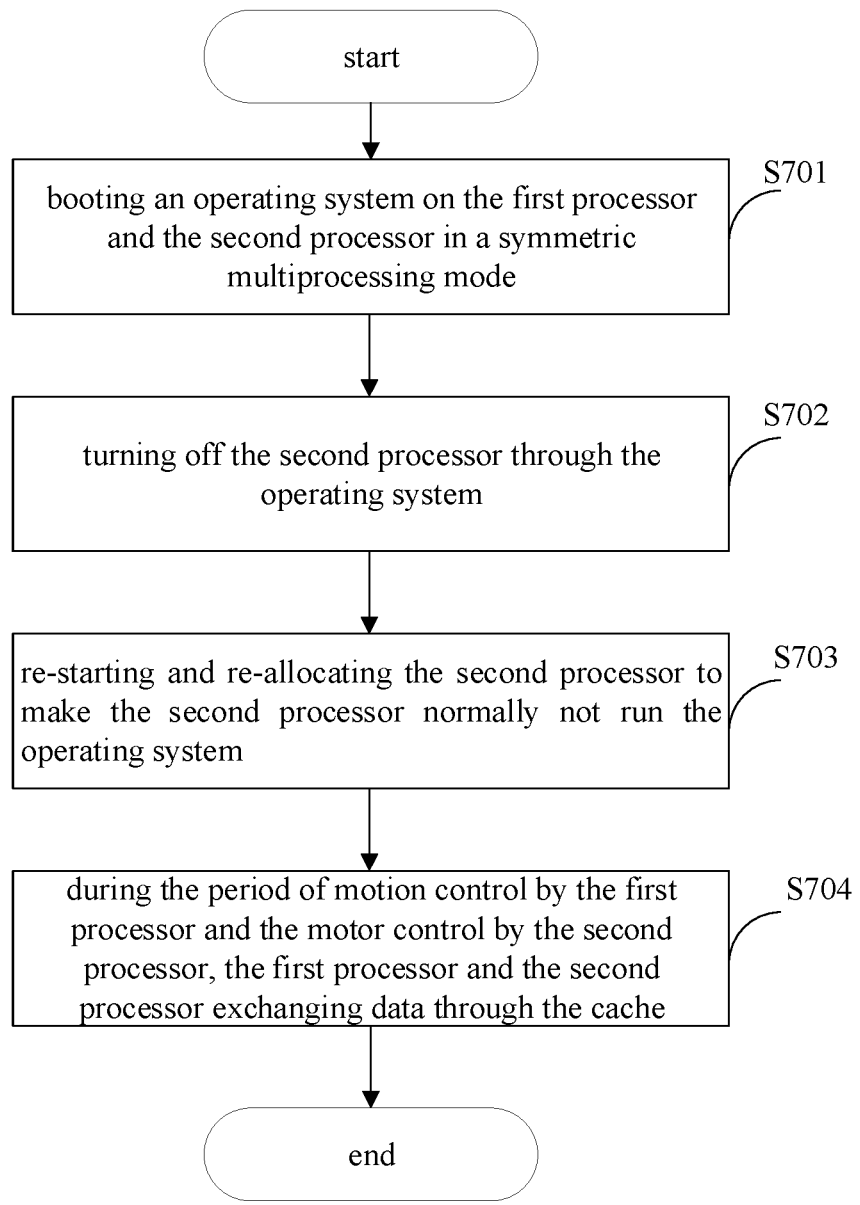
FIG. 7 is a flow chart illustrating a method of performing motion control and motor control by an integrated controller according to an embodiment of the present invention.

FIG. 7 is a flow chart illustrating a method of performing motion control and motor control by an integrated controller according to an embodiment of the present invention. As shown in FIG. 7, the method comprises the following steps:

S701, booting the Linux operating system on the first processor and the second processor in a symmetric multiprocessing mode. In the embodiment, the first processor is the first processing core 21, the second processor is the second processing core 22. Specifying a block of memory as the shared memory and allocating the shared memory to be an I/O memory, such that the addresses of the shared memory are kept without being allocated to other processes by the operating system and the shared memory is specified as cacheable.

S702, turning off the second processor through the operating system. By this time, the first processor individually runs the operating system, and performs an access to the L2 cache. The first processing core also performs a cacheable access to the shared memory.

S703, re-starting and re-allocating the second processor to make the second processor normally not run the operating system. Re-Allocating the second processor to make it perform an access the L2 cache and perform a cacheable access to the shared memory. Now the system is converted into an asymmetric multiprocessing architecture. As mentioned above, the second processor may run another operating system, such as a streamlined operating system compared with the first processor, or the second processor may not run any operating systems.

S704, during the periods of motion control by the first processor and motor control by the second processor, the first processor and the second processor exchanging data through the L2 cache.

Figure 8:
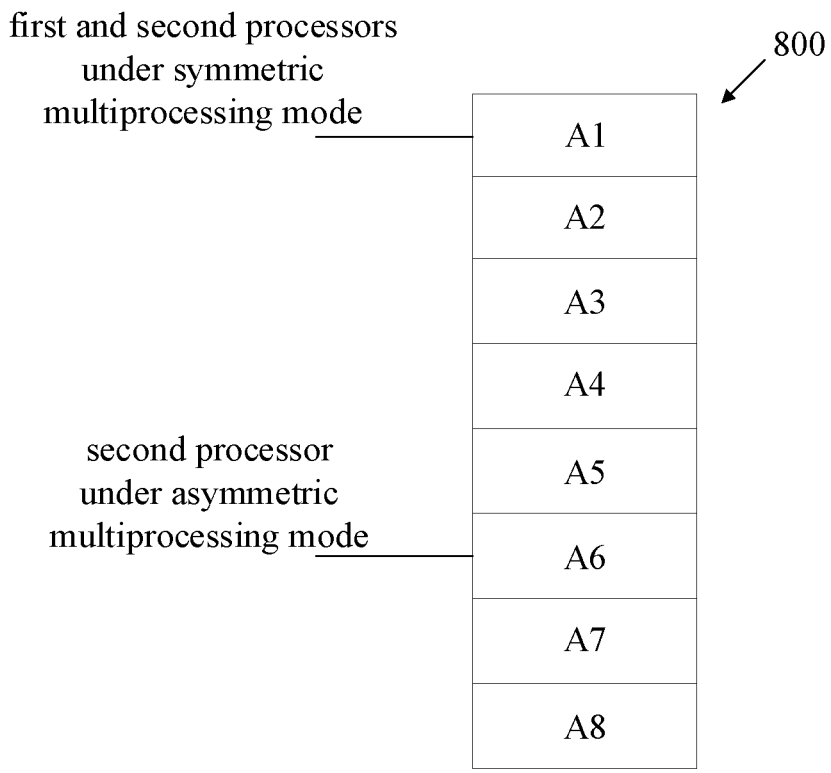
FIG. 8 is a diagram illustrating the first processor and the second processor loading codes according to an embodiment of the present invention.

FIG. 8 is a diagram illustrating the first processor and the second processor loading codes according to an embodiment of the present invention. As shown in FIG. 8, computer codes to be executed by the first processor and the second processor (first processing core and the second processing core) are stored in a nonvolatile memory 800. Under the symmetric multiprocessing mode, the first processing core 21 and the second processing core 22 starts code loading from address A1. Addresses A1 to A5 stores computer codes for the operating system and motion control. Furthermore, the addresses A1 to A5 may also store computer codes for turning off, re-starting and re-allocating the second processing core 22. After the first processing core 21 and the second processing core 22 running the operating system, the second processing core 22 is re-allocated and starts code loading from address A6. Addresses A6 to A8 may store computer codes for motor control by the second processing core 22.

The speed loop control and the current loop control of the motor control task both require high real-time characteristic to ensure smooth and continuous rotation of the motor. However, the operating system always interrupts the on-going processing every now and then to deal with different tasks, which will cause latency of the output of the computing results from the motor control during the interruption if the first processing core performs the speed loop control and the current loop control, thereby affecting the real-time characteristic. Therefore, in an embodiment, the second processing core performs the speed loop control and the current loop control without running the operating system. Furthermore, the second processing core always enables interruption, that is, the second processing core does not need to perform enable/disable interrupt response.

In addition, the second processing core 22 can use a lock-free queue to ensure data consistency.

The controller of the embodiment can be used in various control systems such as electric robots, numerical control machine tools, electric multi-rotor type aircrafts, electromobiles, mechanical prosthesis, mechanical hands, electric movable vehicles, and so on The controller of the embodiment adopts drive and control integration system, which reduces hardware redundancy. Furthermore, since the drive and control integration system can be realized by using a single SOC chip with necessary peripheral circuit elements, hardware occupation is also reduced.

In addition, since the drive and control integration system is built in a single chip, data transmission is performed in the internal of the chip without external interference, which ensures proper and reliable data transmission.

Moreover, the drive and control integration system built in a single ship can ensure high real-time performance. The SOC provides high operation speed, and high communication speed between the first and second processors through the cache. The single chip drive and control integration system can be used in more complicated applications like mobile apparatus, such as unmanned vehicles and UAVs, etc.

Second Embodiment

Figure 4:
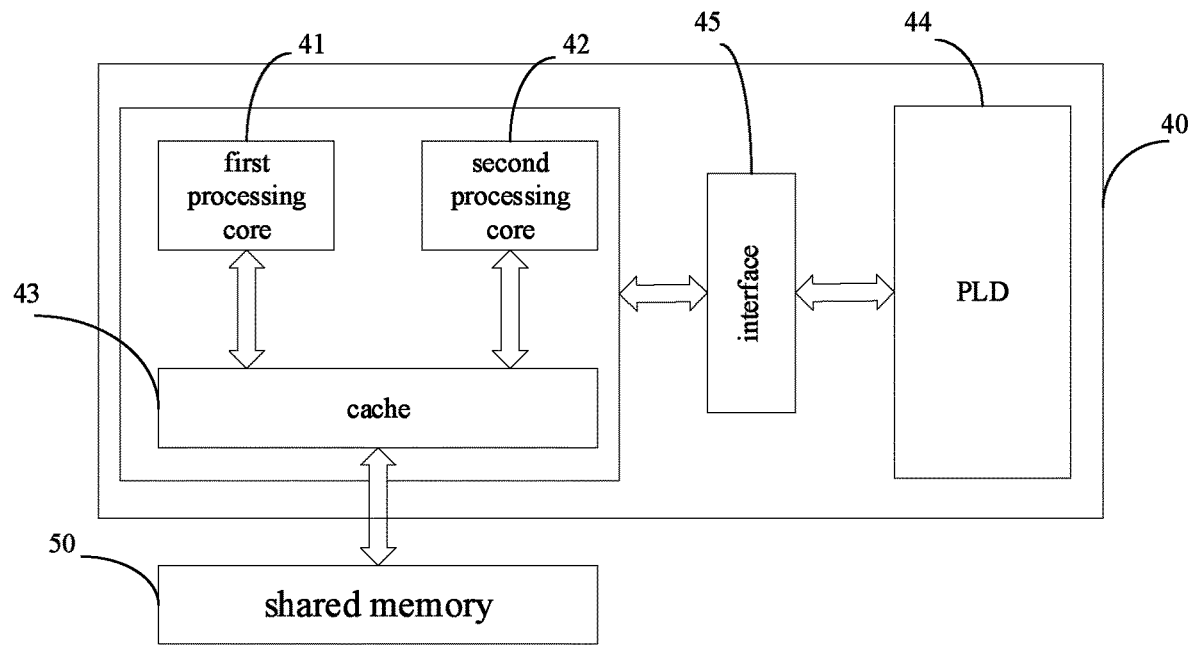
FIG. 4 is a circuit diagram of a controller according to a second embodiment of the present invention.

FIG. 4 is a circuit diagram of a controller according to a second embodiment of the present invention. As shown in FIG. 4, the integrated controller 40 for motion control and motor control comprises a first processing core 41, a second processing core 42, a cache 43, a programmable logic device 44, and a shared memory 50. The first processing core 41 is configured to run an operating system and at least perform motion control. The second processing core 42 is configured to perform motor control and normally not run the operating system. The cache, as known by those skilled in the art, is a memory between a processor and a main memory. The cache operates faster than the main memory at a speed almost close to the processor. The cache 43 can be a Level 2 cache (L2 cache) for a processor. It is understood that the cache 43 can be of other levels. The cache 43 is coupled to the first processing core 41 and the second processing core 42. The shared memory 50 is a dedicated cacheable memory block with fixed addresses, which is specified by the operating system run on the first processing core 41. The shared memory 50 maps onto the cache 43. The first processing core 41 and the second processing core 42 are configured to share the shared memory 50 and accordingly perform data transmission via the cache 43 during the periods of motion control and motor control. For example, the shared memory 50 maps onto the cache 43 through address mapping. When the shared memory 50 maps onto the cache 43, data transmission is performed in the cache 43, which enhances the transmission rate by 8-10 times compared with direct data exchange in a physical memory. The programmable logic device 44 is coupled to the second processing core 42, to perform motor control in conjunction with the second processing core 42.

In the current processor architecture, multiple processing cores sharing the same cache are usually integrated in a same processing chip. Therefore, in the embodiment, the first processing core 41, the second processing core 42 and the cache 43 are integrated in a same chip, such as a processing chip.

In the embodiment, the first processing core 41 runs the operating system and at least performs motion control. The operating system may supervise the operation of the whole controller. The operating system can also perform specific application tasks, like the motion control task. The motion control task aims to calculate target movements of kinematic pairs of a controlled object at every moment. The implementation of the motion control can be various. For example, according to application requirements, different trajectory planning algorithms and task analysis software can be developed to perform various trajectory planning and joint-block conversion. The specific algorithms for such trajectory planning and joint-block conversion can also be greatly different according to applications. For example, forward kinematic algorithms and inverse kinematic algorithms can be applied in industrial robots; UAV flight control algorithms can be applied in UAVs. It is obvious to those skilled in the art to implement the motion control function as required.

The first processing core 41 calculates one or more of the position, speed, acceleration, force and moment of force of the kinematic pairs of the object controlled by the controller 40 at each moment, which are taken as set values of kinematic pairs. In the embodiment, the first processing core 41 also converts the set values of kinematic pairs into given values of motors of the joints of the controlled object at each moment. The given values of motors include position, speed, acceleration, force, moment of force of the motors or their combination. The first processing core 41 outputs the given values of motors to the second processing core 42 at predetermined time. Alternatively, in other embodiments, the first processing core 41 may not perform conversion of set values of kinematic pairs to given values of motors. The first processing core 41 directly outputs the set values of kinematic pairs to the second processing core 42, then the second processing core 42 converts them into the given values of motors and performs corresponding motor control.

Different from the first embodiment, the programmable logic device 44 is introduced in the controller according to the embodiment. The programmable logic device has higher parallel computing ability, which is a great advantage in multi-axis control. The programmable logic device 44 is integrated together with the first processing core 41 and the second processing core 42 in a same chip. The programmable logic device 44 is coupled to the second processing core 42 to work in conjunction with it. In the embodiment, the programmable logic device 44 is coupled to the second processing core 42 through an interface. Some existing SOC chips, like Cyclone V offered by Altera Corporation, offers such interface. In various embodiments, the programmable logic device can be an FPGA.

In the embodiment, the second processing core 42 normally does not run the same operating system with the first processing core 41. Instead, the second processing core 42 and the programmable logic device 44 together constitute the motor controller to perform the motor control task. According to their allocation, the first processing core 41 and the second processing core 42 normally work in an asymmetric multiprocessing architecture. The motor controller controls the motor driver according to the given values of motors to drive the motors to rapidly and stably meet the requirements. The motor control involves current loop control, speed loop control and/or position loop control. Different loop controls may be implemented according to different given values of motors. Generally, when the give value is a positional value, all three loops are required to be calculated; when the given value is a speed related value (speed value or acceleration value), the current loop and the speed loop are required to be calculated; when the given value is a force value or moment of force value, the current loop is required to be calculated. Accordingly, the motor controller alternatively performs the current loop control, or the combination of the current loop control and the speed loop control, or the combination of the current loop control, the speed loop control and the position loop control, to achieve the motor control task. Furthermore, allocation of tasks between the first processing core 41 and the motor controller can be varied. For example, the first processing core 41 performs the position loop control, the motor controller performs the speed loop control and the current loop control; or the first processing core 41 performs the position loop control and the speed loop control, the motor controller performs the current loop control. The task allocation is determined according to the requirements of the loop calculation rate and the performance of the hardware platform.

The motor controller calculates the current by which the motor can reach the required position, speed, acceleration, force or moment of force of the given values of motors, and outputs driving signal (like PWM signal) to power devices such as IGBT devices, IPM devices according to the calculated results to drive the motors.

In an embodiment, the second processing core 42 runs a different operating system than the first processing core 41. For example, the second processing core 42 runs a more streamlined operating system. In another embodiment, the second processing core 22 does not run any operating systems.

In various embodiments, the motion control task is allocated between the second processing core 42 and the programmable logic device 44, which constitute the motor controller as a whole. When the second processing core 42 and the programmable logic device 44 work together to perform the position loop control, the speed loop control and the current loop control, the task allocation can be as follows: the second processing core 42 performs the position loop control while the programmable logic device 44 performs the speed loop control and the current loop control; or the second processing core 42 performs the position loop control and the speed loop control while the programmable logic device 44 performs the current loop control. Even with advanced hardware configuration, the programmable logic device 44 individually performs the position loop control, the speed loop control and the current loop control. When the combination of the second processing core 42 and the programmable logic device 44 only perform part of the control of three loops, such as the speed loop control and the current loop control, the task allocation between the second processing core 42 and the programmable logic device 44 may be adjusted correspondingly. For example, the second processing core 42 performs the speed loop control, and the programmable logic device 44 performs the current loop control.

For a multi-axis apparatus or system which requires accurate and smooth trajectory, it is desired that all the axes are controlled simultaneously and synchronously, so as to ensure a proper resultant motion. Accordingly, when the set values of kinematic pairs or given values of motors are computed and transmitted to the motor controller within a predetermined period, the motion control portion is expected to reliably transmit the set values of kinematic pairs or given values of motors to the motor control portion in a short and consistent time period.

In the embodiment, a method of "sharing the shared memory in an asymmetric multiprocessing architecture" is provided. The first processing core and the second processing core work in an asymmetric multiprocessing architecture in a way that the second processing core for motor control may run a simple operating system different from the first processing core or not run an operating system while the both two processing cores share the cache, thereby ensuring high-speed data transmission with high real-time performance (high real-time performance means low latency and low jittering). In other words, although the first processing core 41 and the second processing core 42 use an asymmetric multiprocessing architecture, they share the cache 43 and further share the shared memory through the cache.

The method comprises the following steps:

Before performing the motion control and motor control, booting the Linux operating system on the first processor and the second processor in a symmetric multiprocessing mode. Specifying a block of memory as the shared memory and allocating the shared memory to be an I/O memory, such that the addresses of the shared memory are kept without being allocated to other processes by the operating system and the shared memory is specified as cacheable.

Turning off the second processor through the operating system.

By this time, the first processor individually runs the operating system and performs an access to the L2 cache. The first processor also performs a cacheable access to the shared memory.

Re-starting and re-allocating the second processor to make the second processor normally not run the operating system. Re-Allocating the second processor to make it perform an access the L2 cache and perform a cacheable access to the shared memory.

By the above means, the processing cores are capable to share the shared memory in an asymmetric multiprocessing architecture. From above, the first processing core 41 and the second processing core 42 are configured to transfer data through the cache 43 during the periods of motion control and motor control. Specifically, during the period of motion control, the first processing core 41 writes the motion control data (like the set values of kinematic pairs or the given values of motor) into the cache 43, while the second processing core 42 reads the motion control data from the cache 43. As mentioned above, in the embodiments of the present invention, the motion control data comprises position data, speed data, acceleration data, force data and/or moment of force data for the kinematic pairs or the motors, and is determined according to the task allocation between the first processing core 41 and the second processing core 42. Correspondingly, the second processing core 42 writes the feedback data into the cache 43, while the first processing core 41 reads the feedback from the cache 43. The feedback data comprises position data, speed data, acceleration data, force data and/or moment of force data from the kinematic pairs or the motors. When the motion control data is position data, then the feedback data generally comprises position data, and can further comprise speed data, acceleration data, force data and moment of force data. When the motion control data is speed data, then the feedback data comprises speed related data, ad can further comprise position data, force data and moment of force data. It is understood that the feedback data can also be unrelated to the motion control data. For example, the feedback data can normally comprise one or more of position data, speed data, acceleration data, force data and moment of force data. In some applications, the feedback data may be position data or attitude data of the controlled object (like the attitude or speed of an UAV or electromobile).

Figure 5:
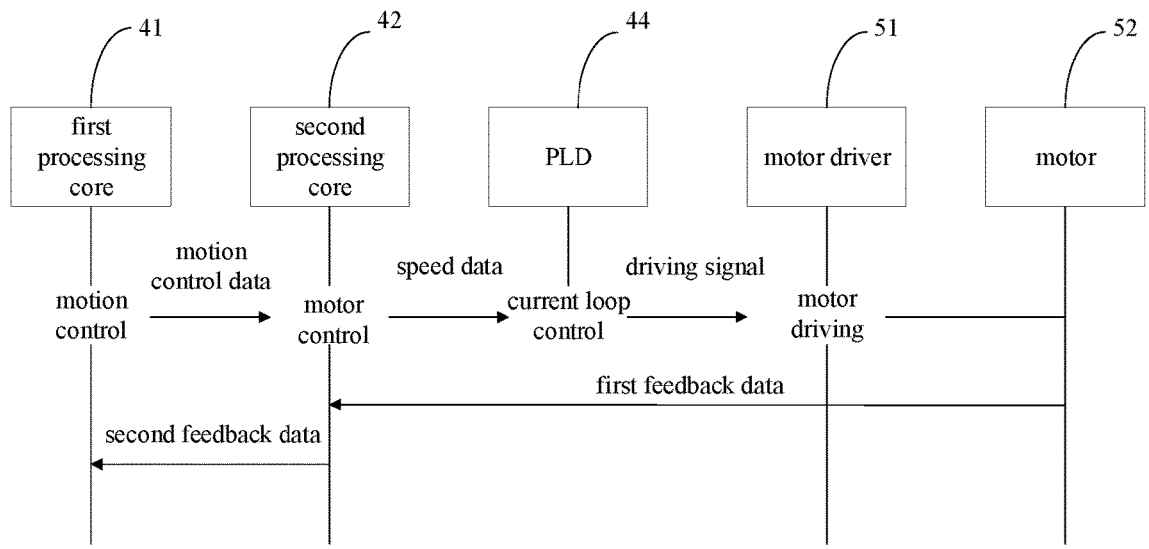
FIG. 5 is a diagram illustrating the operation of the controller according to the second embodiment of the present invention.

FIG. 5 is a diagram illustrating the operation of the controller according to the second embodiment of the present invention. As shown in FIG. 5, the first processing core 41 generates and outputs the motion control data to the second processing core 42. The second processing core 42 and the programmable logic device 44 generate and output the driving signal to the motor driver 51 according to the motion control data. The motor driver 51 outputs current to control the rotation of the motor 52. In the embodiment, if the second processing core 42 performs the position loop control and the speed loop control, then the programmable logic device 44 performs the current loop control. The first feedback data collected from the motor 52 is transmitted to the second processing core 52. The second processing core 42 outputs second feedback data to the first processing core 41. The first feedback may comprise one or more of position data, speed data, acceleration data, force data, and moment of force data. The second feedback may be completed obtained from the first feedback data, or may not be totally from the first feedback data. For example, the second feedback data may comprise data generated by the second processing core 42. As shown in FIG. 3, the communication between the first processing core 41 and the second processing core 42 is realized through the cache 43 as shown in FIG. 4. As required, the first feedback data or the second feedback data may not be necessary in local-loop control or complete-loop control, which will not affect the basic function and performance of the entire control system.

Since accessing a cache is much faster than accessing a main memory, the operation speed of the first processing core 41 and the second processing core 42 is greatly enhanced. Particularly, the first processing core 41 and the second processing core 42 are integrated in a single SOC chip, which originally has a programmable logic device therein. For a multi-axis apparatus or system which requires accurate and smooth trajectory, it is desired that all the axes are controlled simultaneously and synchronously, so as to ensure a proper resultant motion. Accordingly, the motor controller utilizes one CPU (the second processor) and an FPGA (programmable logic device) to realize 8-axis motor control, which fully take advantages of higher parallel computing ability of the FPGA (programmable logic device).

The present invention also provides a method to change the symmetric multiprocessing to asymmetric multiprocessing, so as to implement the aforementioned "sharing of the shared memory in an asymmetric multiprocessing architecture".

The method can refer to the description in the first embodiment and FIG. 7, which is not detailed herein.

In some embodiments, the programmable logic device 44 can also share the shared memory 50 with the first processing core 41 and the second processing core 42, which is not detailed herein.

Data jittering occurred during the period that the programmable logic device 44 feedbacks the speed data and position data to the second processing core 42 may cause abrupt current change in the speed loop control, which will degrade the performance of the motor. Since the programmable logic device 44 and the processing system (comprising the first and second processing cores 41, 42) are two independent computing elements, how to keep data synchronization between them and how to provide continuous and complete data feedback from the programmable logic device 44 are critical problems to be solved.

Figure 9:
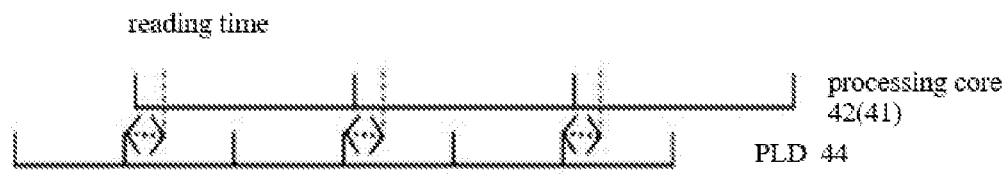
FIG. 9 is a diagram illustrating timing and refresh cycles of the second processor and the programmable logic device according to an embodiment of the present invention.

In an embodiment, as shown in FIG. 9, the two computing elements, the processing system and the programmable logic device 44 use a same external clock (crystal oscillation) to ensure that both of the two are clock synchronized with a same time base. Therefore, the time period for the processing system to read data from the programmable logic device 44 is relative certain, and a staggered time is introduced between the data update cycle of the programmable logic device 44 and the data update cycle of the processing system. Therefore, the FPGA updates data at a certain time, and the processing system reads data after the certain time.

In an embodiment, all the internal clock signal of the programmable logic device 44 is divided (e.g. by a PLL frequency divider) from a same clock source. Accordingly, all the data from the programmable logic device 44 are transmitted synchronously. Furthermore, the processor (the second processing core 42), the bus, the programmable logic device 44 use the same clock.

Figure 10:
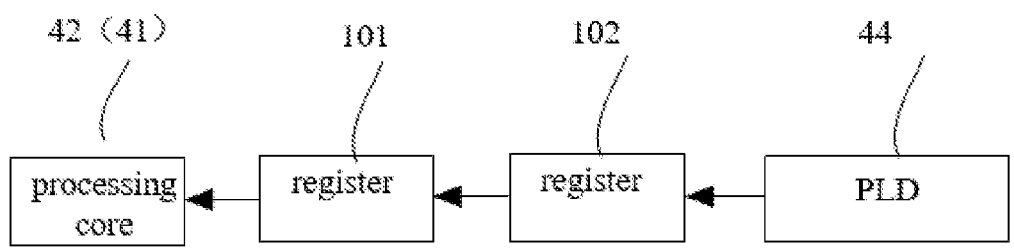
FIG. 10 is a diagram illustrating registers of the programmable logic devices according to an embodiment of the present invention.

In an embodiment, as shown in FIG. 10, the programmable logic device 44 comprises two registers 101, 102 to latch the current data when the first processing core 41 and the second processing core 42 read data, so as to avoid data lost due to metastability occurred in asynchronous design.

This is also called "Shadow Register". As shown in FIG. 10, the programmable logic device 44 internally performs mathematical computation and stores the result data in the register 102. Then, the result data is further stored in the register 101. Through such clock tick, the processing system can read complete and correct data from the programmable logic device. During the time period that the processing system reads data, updating of data in the registers of the programmable logic device can be prevented. In the embodiment, the registers 101, 102 can be flip-flops.

Third Embodiment

Figure 6:
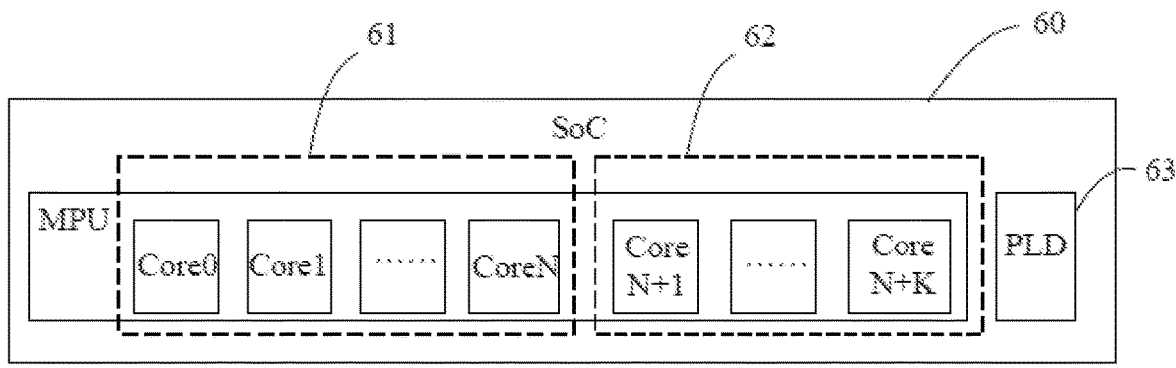
FIG. 6 is a circuit diagram of a controller according to a third embodiment of the present invention.

FIG. 6 is a circuit diagram of a controller according to a third embodiment of the present invention. As shown in FIG. 6, the integrated controller 60 for motion control and motor control comprises a first processing core combination 61, a second processing core combination 62, a programmable logic device 63, a cache (not shown), and a shared memory (not shown). The first processing core combination 61 is configured to run an operating system and at least perform motion control. The second processing core combination 62 is configured to perform motor control and normally not run the operating system. The cache is coupled to the first processing core combination 61 and the second processing core combination 62. The shared memory maps onto the cache. The first processing core combination 61 and the second processing core combination 62 are configured to share the shared memory and accordingly perform data transmission via the cache during the periods of motion control and motor control. Different from the aforementioned embodiments, the first processing core combination 61, operated as the first processor, comprises 1 to $N^{th}$ processing cores; the second processing core combination 62, operated as the second processor, comprises $N+1^{th}$ to $N+k^{th}$ processing cores. Herein, N and K are both positive integers.

The programmable logic device 63 is coupled to the second processing core combination 62, to perform motor control in conjunction with the second processing core combination 62. Refer to the first embodiment, the programmable logic device 63 can also be omitted, the second processing core combination 62 can individually perform motor control.

For the first processing core combination 61, the operating system and the motion control task can be allocated between the multiple processing cores. For the second processing core combination 62, the motor control task can be allocated between the multiple processing cores.

Other details of the embodiment can refer to the first and second embodiments, which is omitted herein.

While this invention has been particularly shown and described with references to preferred embodiments thereof. This invention may, however, be embodied in different forms and should not be construed as limited to the embodiments set forth herein. It will be understood by those skilled in the art that various changes in form and details may be made herein without departing from the spirit and scope of the invention as defined by the appended claims.

The invention claimed is:

1. An integrated controller for motion control and motor control, comprising
a first processor configured to run an operating system and at least perform motion control, wherein the motion control comprises calculating set values of kinematic pairs of a controlled object at each moment;
a second processor configured to at least perform motor control and normally not run the operating system, wherein the motor control comprises controlling rotation of motors according to the set values, which at least comprises any one or a combination of motor current loop control, motor speed loop control, and motor position loop control;
a cache coupled to the first processor and the second processor;
a shared memory, which is a dedicated cacheable memory block with fixed addresses specified by the operating system; wherein,
the shared memory maps onto the cache;
the first processor and the second processor are configured to share the shared memory and accordingly perform data transmission via the cache during the periods of motion control and motor control;
the first processor, the second processor and the cache are integrated in a same chip.

2. The integrated controller according to claim 1, wherein prior to the motion control and motor control, the integrated controller is configured to perform the following operations:
starting the first processor and the second processor by symmetric multiprocessing;
running the operating system on the first processor and the second processor;
turning off the second processor and running the operating system individually on the first processor;
re-starting and re-configuring the second processor to make the second processor normally not run the operating system.

3. The integrated controller according to claim 1, wherein the first processor is configured to write motion control data into the cache, the second processor is configured to read the motion control data from the cache, wherein the motion control data comprises position data, speed data, acceleration data, force data, and/or moment of force data for the kinematic pairs or the motors.

4. The integrated controller according to claim 1, wherein the second processor is configured to write feedback data into the cache, the first processor is configured to read the feedback from the cache, wherein the feedback data comprises position data, speed data, acceleration data, force data, and/or moment of force data from the kinematic pairs or the motors.

5. The integrated controller according to claim 2, wherein the first processor is configured to write motion control data into the cache, the second processor is configured to read the motion control data from the cache, wherein the motion control data comprises position data, speed data, acceleration data, force data, and/or moment of force data for the kinematic pairs or the motors.

6. The integrated controller according to claim 2, wherein the second processor is configured to write feedback data obtained from the controlled object into the cache, the first processor is configured to read the feedback from the cache, wherein the feedback data comprises position data, speed data, acceleration data, force data, and/or moment of force data from the kinematic pairs or the motors.

7. An integrated controller for motion control and motor control, comprising:
a first processor configured to run an operating system and at least perform motion control, wherein the motion control comprises calculating set values of kinematic pairs of a controlled object at each moment;
a second processor configured to at least perform motor control and normally not run the operating system, wherein the motor control comprises controlling movement of motors according to the set values, which at least comprises any one or a combination of motor current loop control, motor speed loop control, and motor position loop control;
a cache coupled to the first processor and the second processor;
a shared memory, which is a dedicated cacheable memory block with fixed address specified by the operating system;
a programmable logic device coupled to the second processor and configured to perform the motor control in conjunction with the second processor; wherein,
the shared memory maps onto the cache;
the first processor and the second processor are configured to share the shared memory and accordingly perform data transmission via the cache in the periods of motion control and motor control;
the first processor, the second processor and the cache are integrated in a same chip.

8. The integrated controller according to claim 7, wherein the first processor is configured to write motion control data into the cache, the second processor is configured to read the motion control data from the cache, wherein the motion control data comprises position data, speed data, acceleration data, force data, and/or moment of force data for the kinematic pairs or the motors.

9. The integrated controller according to claim 8, wherein the second processor is configured to write feedback data into the cache, the first processor is configured to read the feedback from the cache, wherein the feedback data comprises position data, speed data, acceleration data, force data, and/or moment of force data from the kinematic pairs or the motors.

10. The integrated controller according to claim 8, wherein a clock of the programmable logic device and a clock of the second processor are synchronized; when the second processor reads or writes data from or to the programmable logic device, the programmable logic device latches the data being read or written.

11. The integrated controller according to claim 9, wherein a clock of the programmable logic device and a clock of the second processor are synchronized; when the second processor reads or writes data from or to the programmable logic device, the programmable logic device latches the data being read or written.

12. The integrated controller according to claim 7, wherein prior to the motion control and motor control, the integrated controller is configured to perform the following operations:
starting the first processor and the second processor by symmetric multiprocessing;
running the operating system on the first processor and the second processor;
turning off the second processor and running the operating system individually on the first processor;
re-starting and re-configuring the second processor to make the second processor normally not run the operating system.

13. An integrated controller for motion control and motor control, comprising:
a first processor configured to run an operating system and at least perform motion control, wherein the motion control comprises calculating set values of kinematic pairs of a controlled object at each moment;
a second processor configured to at least perform motor control and normally not run the operating system, wherein the motor control comprises controlling movement of motors according to the set values, which at least comprises any one or a combination of motor current loop control, motor speed loop control, and motor position loop control;
a cache coupled to the first processor and the second processor;
a shared memory, which is a dedicated cacheable memory block with fixed address specified by the operating system;
a programmable logic device coupled to the second processor and configured to perform the motor control in conjunction with the second processor; wherein,
the shared memory maps onto the cache;
the first processor and the second processor are configured to share the shared memory and accordingly perform data transmission via the cache in the periods of motion control and motor control;
the first processor, the second processor, the cache and the programmable logic device are integrated in a same chip.

14. The integrated controller according to claim 13, wherein the first processor is configured to write motion control data into the cache, the second processor is configured to read the motion control data from the cache, wherein the motion control data comprises position data, speed data, acceleration data, force data, and/or moment of force data for the kinematic pairs or the motors.

15. The integrated controller according to claim 14, wherein the second processor is configured to write feedback data into the cache, the first processor is configured to read the feedback from the cache, wherein the feedback data comprises position data, speed data, acceleration data, force data, and/or moment of force data from the kinematic pairs or the motors.

16. The integrated controller according to claim 14, wherein a clock of the programmable logic device and a clock of the second processor are synchronized; when the second processor reads or writes data from or to the programmable logic device, the programmable logic device latches the data being read or written.

17. The integrated controller according to claim 15, wherein a clock of the programmable logic device and a clock of the second processor are synchronized; when the second processor reads or writes data from or to the programmable logic device, the programmable logic device latches the data being read or written.

18. The integrated controller according to claim 13, wherein prior to the motion control and motor control, the integrated controller is configured to perform the following operations:
starting the first processor and the second processor by symmetric multiprocessing;
running the operating system on the first processor and the second processor;
turning off the second processor and running the operating system individually on the first processor;
re-starting and re-configuring the second processor to make the second processor normally not run the operating system.

* * * * *